A. F. KAUFMANN.
CAR STARTER.
No. 179,796. Patented July 11, 1876.
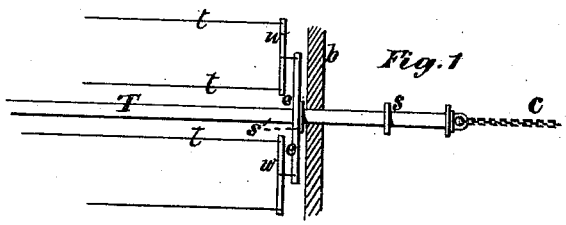
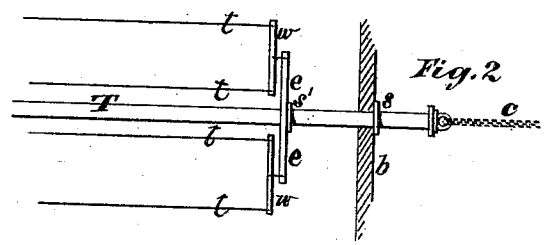
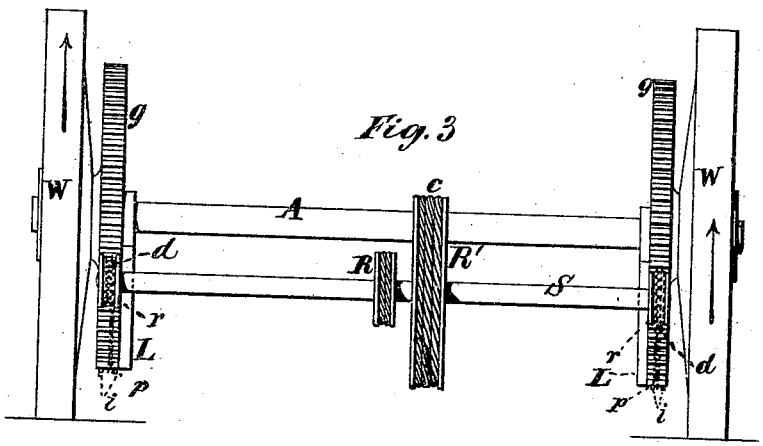
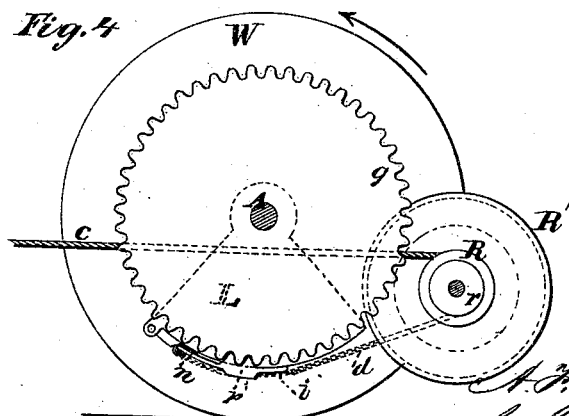
Witnesses:
Michael Ryan
Fred. Haynes
A. F. Kaufmann
by his Attorneys
Brown & Allen

UNITED STATES PATENT OFFICE.

ADOLF F. KAUFMANN, OF HAMBURG, GERMANY.

IMPROVEMENT IN CAR-STARTERS.

Specification forming part of Letters Patent No. 179,796, dated July 11, 1876; application filed April 4, 1876.

*To all whom it may concern:*

Be it known that I, ADOLF FRANZ KAUFMANN, of Hamburg, in the Empire of Germany, have invented an Improvement in Apparatus for Starting Vehicles; and I do hereby declare that the following is a full, clear, and exact description of the same, reference being had to the accompanying drawing, which forms part of this specification.

My invention has for its object the aiding of horses or other draft-animals in the starting of vehicles drawn by such animals, either upon a level or upon ascending grades; and it consists in mechanism whereby the draft of the animal is temporarily applied to moving the vehicle at a slower rate than that at which the animals advance, the mechanism supplying a powerful leverage, sufficient to overcome the inertia of the vehicle and its load, and to get the same under motion while the animals are advancing faster than the vehicle.

In the accompanying drawing, Figures 1 and 2 are diagrams, representing the tongue of a vehicle to which my starting apparatus is applied. Fig. 3 represents a rear-end view of the vehicle, the hinder axle-tree, and the wheels thereof, to which the apparatus is applied. Fig. 4 is a section of the same.

T, Figs. 1 and 2, represents the pole or tongue of the vehicle, to which the whiffle-trees and evener $w$ and $e$ are attached, and to which the draft of the animals is applied through the traces $t$. To the tongue T are attached stops $s\ s'$. The stop $s$ abuts against a beam, $b$, when the tongue is drawn forward, and the stop $s'$ abuts against the same beam when the tongue is drawn toward the rear. The tongue is drawn forward by the animal or animals attached to it, and it is drawn rearward by mechanism hereinafter described. To the rear end of the tongue T is attached a chain or rope, $c$, which extends backward to a roller, R, Figs. 3 and 4, and which is wound around the roller R, the end of the said chain or rope being fastened to the said roller. The roller R is firmly attached to the shaft S, Fig. 3, the shaft S resting and turning in suitable bearings formed in supports, (not shown in the drawing,) but firmly attached to some part of the body or running-gear of the vehicle. Upon the extremities of the shaft S are fastened other rollers, $r$, to which are fastened, and upon which wind, chains $d$, said chains being fastened to, and connecting the levers L with, the rollers $r$. The levers L are preferably made sector-shaped, in order to give them sufficient weight to operate, as hereinafter specified, and they are pivoted loosely on the hinder axle-tree A. To the levers L are pivoted the pawls $p$, which, in use, engage the toothed wheels $g$, said toothed wheels being firmly joined to the hinder wheels W of the vehicle. In the pawls $p$ are inserted pins $i$ on their under sides, which serve to guide the chains $d$ along their under surface.

The apparatus operates as follows: When the animal or team attached to the vehicle is stopped and backed slightly, the tongue T moves back till the stop $s'$ abuts against the beam $b$, Figs. 1 and 2. The chain or rope $c$ is thus slackened, and the levers L drop by their own weight into their lowest position, and in so doing unwind the chains $d$ from the rollers $r$, turn the shaft S, and wind the chain or rope $c$ on the roller R. Upon starting the team, the tongue T is drawn forward again, carrying with it the chain or rope $c$, unwinding the latter from the roller R, turning the shaft S, and winding the chains $d$ upon the rollers $r$. The chains $d$, pressing against the under sides of the pawls $p$, cause said pawls to engage with the toothed wheels $g$, and at the same time the levers L, to which the pawls are pivoted, are drawn backward relatively to the axle-tree A, turning the wheels W in the direction indicated by the arrows, and thus propelling the vehicle forward.

When the tongue T has been drawn forward as far as it will move, the draft is transferred from the toothed wheel $g$ to the beam $b$, Figs. 1 and 2, against which the stops $s$ on the tongue T abut. The pawls $p$ may then be allowed to slide over the teeth of the toothed wheel $g$, or a spring, $n$, may be used to press the pawls away from said teeth.

When greater purchase is required, as in ascending heavy grades, a larger roller, R', may be placed on the shaft S, and toothed gearing may also be used to increase the purchase.

I claim—

The combination of the movable tongue T, the chain or rope c, the roller R, the shaft S, the rollers r, the chains d, the levers L, the pawls p, and the toothed wheels g, attached to the wheels W of the vehicle, arranged and operated substantially as described.

ADOLF FRANZ KAUFMANN.

Witnesses:
 CH. BARMANN,
 F. KEHL.